(12) United States Patent
Elwedini

(10) Patent No.: US 6,841,759 B2
(45) Date of Patent: Jan. 11, 2005

(54) INDOOR BARBECUE

(75) Inventor: A. Omar Elwedini, Toronto (CA)

(73) Assignee: Candaplan Resource Inc., Toronto (CA)

( * ) Notice: Subject to any disclaimer, the term of this patent is extended or adjusted under 35 U.S.C. 154(b) by 83 days.

(21) Appl. No.: 10/289,207

(22) Filed: Nov. 7, 2002

(65) Prior Publication Data

US 2004/0089163 A1 May 13, 2004

(30) Foreign Application Priority Data

Nov. 6, 2002 (CA) .............................................. 2411298

(51) Int. Cl.[7] .......................... A47J 37/06; A23B 4/044
(52) U.S. Cl. ...................... 219/386; 219/392; 219/408; 99/446; 99/450; 99/482
(58) Field of Search ................................ 219/385, 386, 219/391, 392, 408, 411; 99/444, 446, 482, 450; 126/25 R, 27

(56) References Cited

U.S. PATENT DOCUMENTS

| | | | | |
|---|---|---|---|---|
| 3,086,449 A | * | 4/1963 | Cahill ........................... 99/446 |
| 3,098,427 A | * | 7/1963 | Del Francia ................... 99/446 |
| 3,487,199 A | * | 12/1969 | Hamlin ......................... 219/399 |
| 3,583,307 A | * | 6/1971 | Lee, Sr. ......................... 99/333 |
| 3,745,912 A | * | 7/1973 | Field ............................. 99/446 |
| 3,817,166 A | * | 6/1974 | McLain ........................ 99/480 |
| 4,190,677 A | * | 2/1980 | Robins ......................... 426/315 |
| 4,355,570 A | * | 10/1982 | Martin et al. ................. 99/446 |
| 4,554,864 A | * | 11/1985 | Smith et al. .................. 99/340 |
| 4,589,333 A | | 5/1986 | Murphy |
| 4,643,163 A | * | 2/1987 | Martinez ................... 126/41 A |
| 4,663,517 A | | 5/1987 | Huff et al. |
| 4,827,903 A | | 5/1989 | Kim |
| 5,070,777 A | * | 12/1991 | Novak .......................... 99/482 |
| 5,404,801 A | | 4/1995 | Holland |
| 6,035,770 A | * | 3/2000 | Whitefield .................... 99/482 |
| 6,705,211 B2 | * | 3/2004 | Dong et al. ................... 99/415 |
| 2004/0025714 A1 | * | 2/2004 | Neal et al. .................... 99/482 |

\* cited by examiner

Primary Examiner—Joseph Pelham
(74) Attorney, Agent, or Firm—Sim & McBurney; Geoffrey B. C. deKleine

(57) ABSTRACT

An indoor barbecue is provided for indoor cooking of food. The barbecue has a body defining a cavity and a lid for engaging with the body to define a cooking chamber. A cooking rack is supported by the body within the cooking chamber and a container is disposed within the cooking chamber for receiving charcoal. A heat source is provided in the cooking chamber for cooking the food when placed on the cooking rack

11 Claims, 3 Drawing Sheets

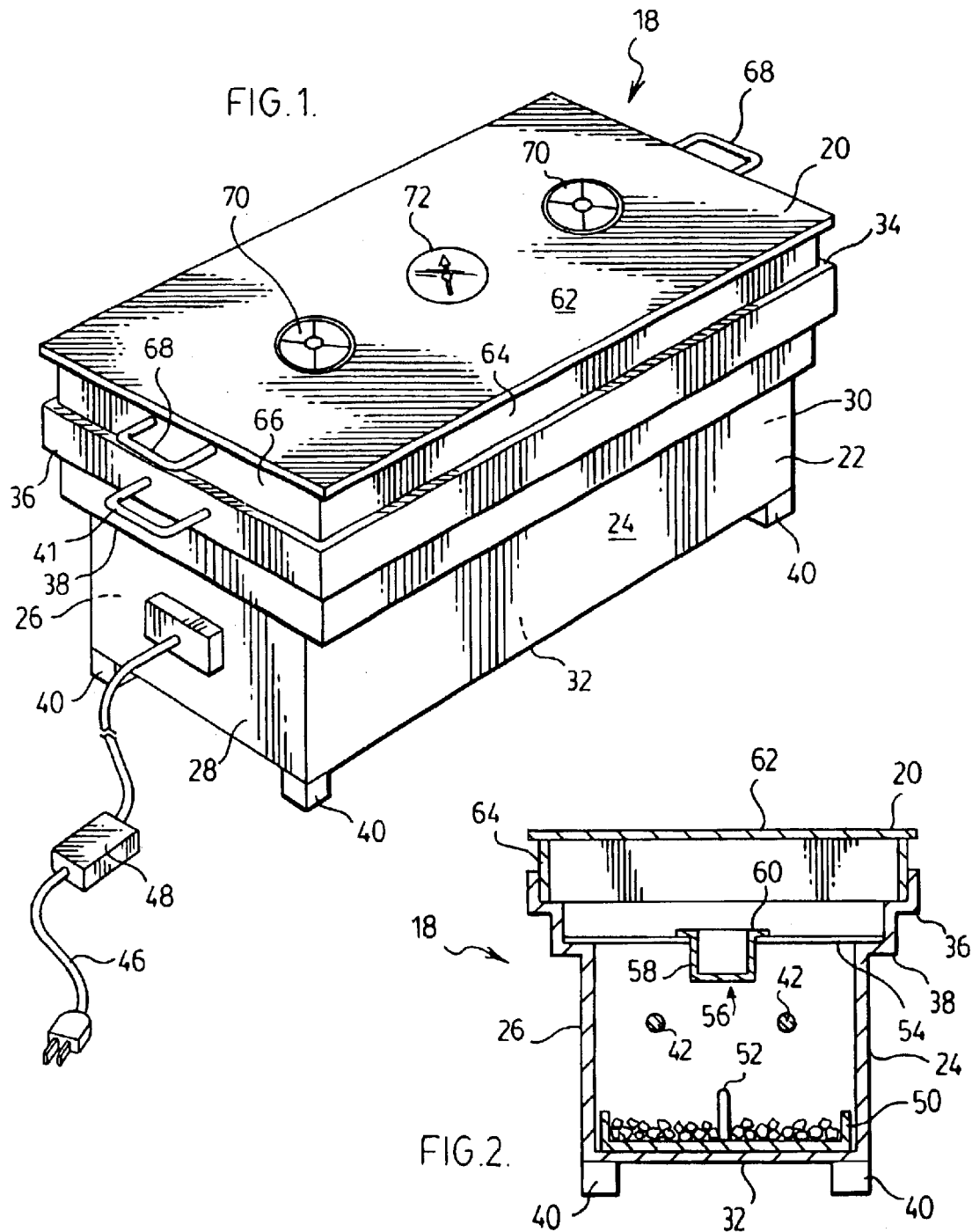

INDOOR BARBECUE

FIELD OF THE INVENTION

The present invention relates to barbecues. In particular, the present invention relates to a charcoal indoor barbecue that imparts an outdoor barbecue flavor to food without substantial production of heavy smoke and gaseous combustion by-products.

BACKGROUND OF THE INVENTION

Outdoor barbecuing is a popular method of cooking and preparing various foods such as meats, poultry, fish and vegetables. This popularity is largely due to the unique flavor imparted to the food by the barbecuing process, which is often referred to as "barbecue", "smoke" or "charcoal" flavor, and also due to the fact that barbecuing is a relatively simple way of preparing such food.

Outdoor barbecuing is normally dependent on the weather and usually limited to the warmer months of the year. In addition, most people living in condominiums or apartments are prohibited from barbecuing on their balconies. Conventional barbecues are not intended for indoor use due to the heavy smoke and gaseous combustion by-products that are given off.

Many indoor barbecues have been developed in an attempt to provide the smell, taste and look of barbecue food without substantial production of heavy smoke and gaseous combustion by-products. For example, electric indoor barbecues provide one method of safely barbecuing indoors. Many of these designs include electric hotplates with grill-like surfaces for conveying a grill-like look to the food. Other electric indoor barbecues include those described in U.S. Pat. No. 4,589,333 to Murphy and U.S. Pat. No. 4,663,517 to Huff and Bales. These barbecues, however, do not impart the traditional outdoor barbecue flavor to food.

Most indoor barbecues substitute lava rock or other suitable heat retentive material for charcoal briquettes or combustible material. The lava rock, heated from below either by an electric or a gas burner, cooks the food in much the same manner as burning charcoal briquettes, but without the production of noxious fumes and ash residue. These barbecues however, also fail to impart the traditional barbecue flavor to food.

Much of the heavy smoke and gaseous combustion by-products produced during barbecuing is result of fat dripping from the food onto the hot briquettes. Since the amount of fat drippings differs among various foods, the amount of smoke emanating from the heating elements is often difficult to control and can quickly spoil the charm of indoor barbecuing. To address this particular disadvantage, filtration elements have been incorporated into smoke exhaust systems mounted atop a barbecue hood. Such exhaust elements are disclosed in U.S. Pat. No. 5,404,801 to Holland. U.S. Pat. No 4,827,903 to Kim discloses a table mounted cooker which includes a filter which removes contaminants from the smoke exhaust as the smoke exhaust is drawn through a chimney or ventilation system. These types of barbecues are somewhat complicated and may not be suitable for ordinary indoor use.

It is apparent, therefore, that there is a need for an indoor barbecue that imparts a barbecue flavor to food and, at the same time, obviates or mitigates at least some of the shortcomings of the prior art.

SUMMARY OF THE INVENTION

In accordance with one embodiment of the present invention a barbecue for indoor cooking of food is provided. The barbecue has a body defining a cavity and a lid for engaging with the body to define a cooking chamber. A cooking rack is supported by the body, within the cooking chamber and a container is disposed within the cooking chamber for receiving combustible briquettes A heat source is provided in the cooking chamber for cooking the food when placed on the cooking rack.

In another aspect, there is provided a barbecue for indoor cooking of food, comprising a generally hollow body having side walls and a base and a lid for engaging with the body to define a cooking chamber. A cooking rack is supported by the body within the cooking chamber and a drip tray is supported by the body, under the cooking rack when the body is in an upright position The drip tray is used for receiving an absorbent material to absorb drippings from the food. An electric heat source is supported by the body between the cooking rack and the drip tray, for cooking the food and a container is disposed within the cooking chamber for receiving combustible material.

Advantageously, the barbecue includes a container disposed within the cooking chamber for receiving an amount of combustible material, such as charcoal briquettes, for imparting a barbecue flavor to the food on the cooking rack, without substantial production of heavy smoke and gaseous combustion by-products. In one aspect, a drip tray is provided for receiving absorbent material, such as crushed stones, to absorb drippings from the food.

BRIEF DESCRIPTION OF THE DRAWINGS

A preferred embodiment of the present invention will now be described more fully with reference to the accompanying drawings in which, FIG. 1 shows a perspective view of an indoor barbecue in accordance with an embodiment of the present invention;

FIG. 2 shows an end view of the indoor barbecue of FIG. 1,

DETAILED DESCRIPTION OF THE PREFERRED EMBODIMENTS

A preferred embodiment of the indoor barbecue is shown in FIG. 1 and indicated generally by the numeral 18 FIG. 1 shows the barbecue 18 having a lid 20 and a stepped body 22, defining a cooking chamber The lid 20 engages with the stepped body 22.

Figure 3:
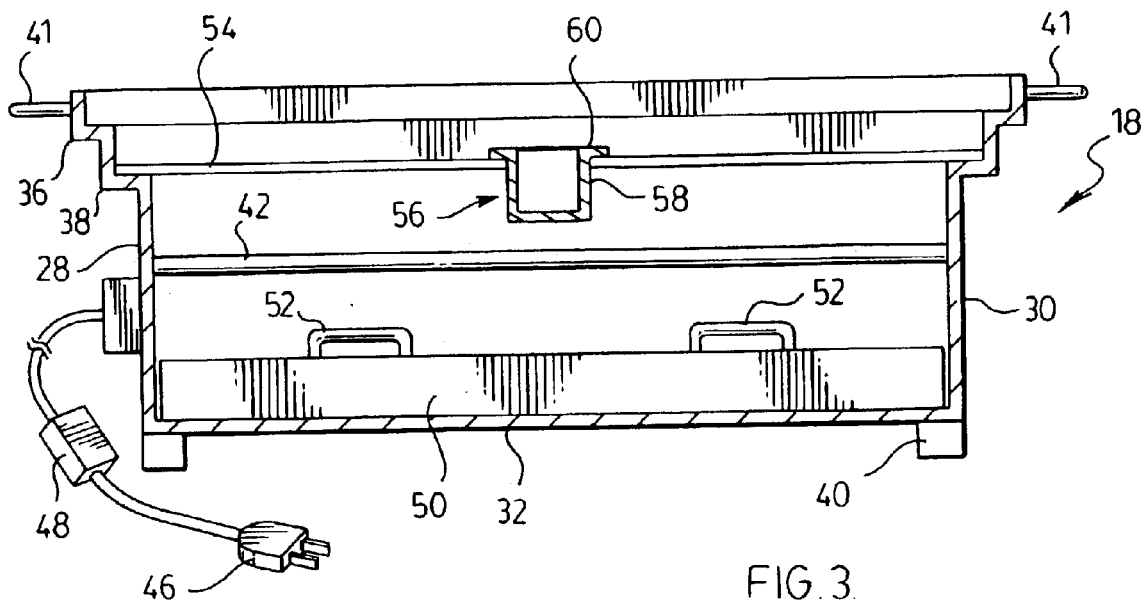
FIG. 3 shows a partial side view of a body of the indoor barbecue of FIG. 1 with the body in section.

Reference is now made to FIGS. 1–3 to describe the body 22. The body 22 has a pair of opposing stepped side walls 24, 26 and a pair of opposing stepped end walls 28, 30, extending upwardly from a generally rectangular base 32. An upper lip 34 extends around the upper periphery of the side walls 24, 26 and end walls 28, 30, defining a generally rectangular opening to the interior of the body 22. The stepped side walls 24, 26 and stepped end walls 28, 30 define a pair of steps in the body 22, including an upper step 36 and a lower step 38 between the base 22 and the upper lip 34, proximal the opening. Clearly, the side walls 24, 26 and end walls 28, 30 diverge in a step wise fashion from the base 32 to the upper lip 34 such that the area of the base 32 is less than the area of the opening defined by the upper lip 34.

Four legs 40 extend generally downwardly from each corner of the underside of the rectangular base 32 to provide a support stand for the body 22 For handling and maneuvering the body 22, a pair of handles 41 are fixed to the upper step 36 and extend longitudinally outwardly from the exterior surface of the end walls 28, 30

A pair of heating elements 42 are fixed to the interior surface of the end wall 28 and extend longitudinally through the interior of the body 22. A power supply 44 is electrically connected to the heating elements 42 and includes a power cord 46 for providing power to the heating elements 42 and a variable thermostat 48 for controlling the heating elements 42

Figure 4:
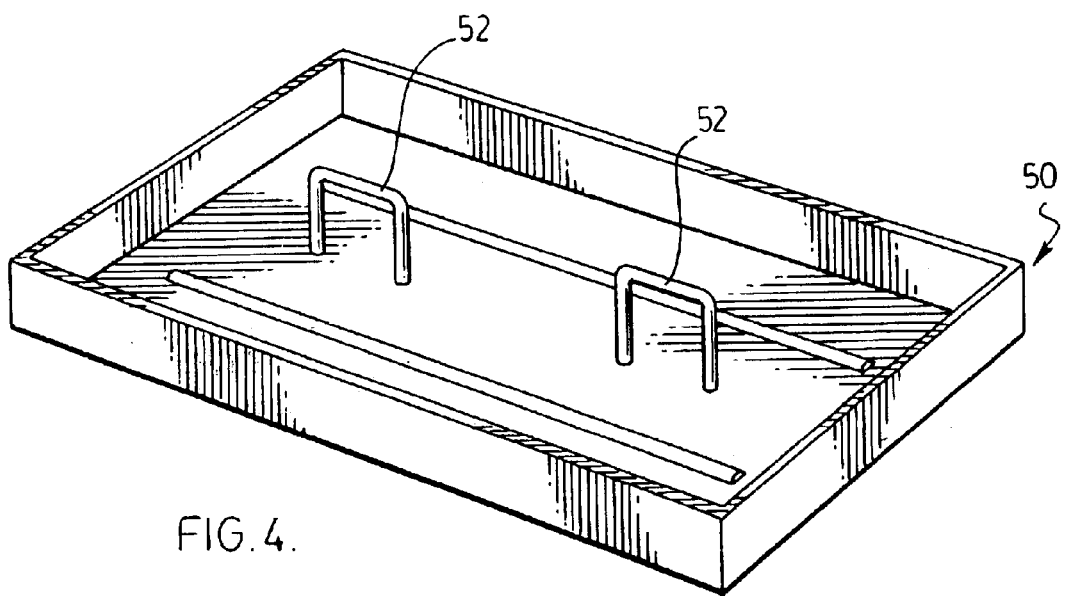
FIG. 4 shows perspective view of a drip tray of the indoor barbecue of FIG. 1.

In the interior of the body 22, a removable drip tray 50 rests on the interior surface of the base 22, as shown in FIGS. 2, 3 and 4. The drip tray 50 is intended to receive absorbent material, such as crushed stones, for absorbing fluid that drips from food when the indoor barbecue 18 is in use. The drip tray 50 includes a pair of longitudinally spaced handles for grasping to remove the drip tray 50 from the body 22.

Figure 5:
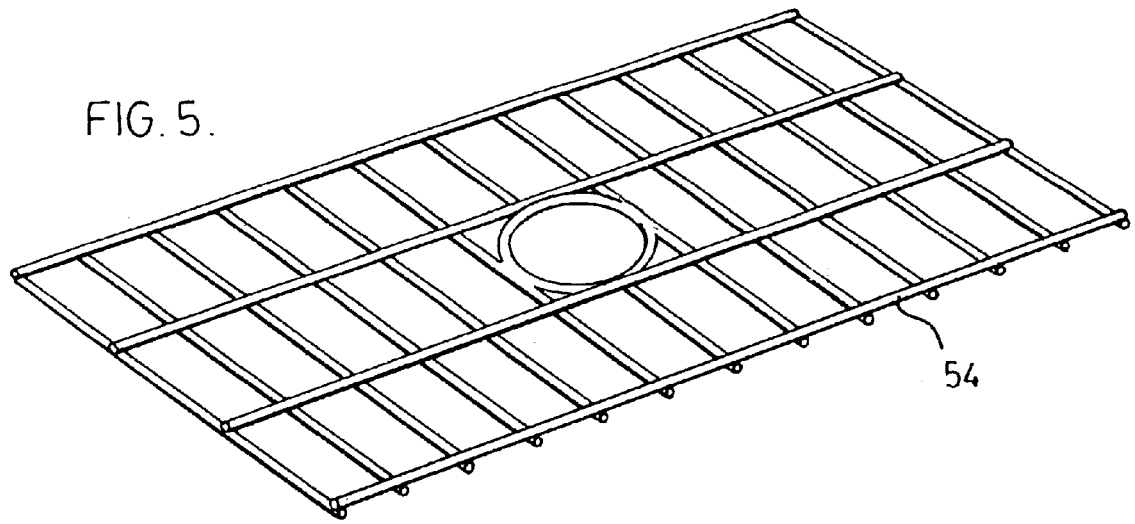
FIG. 5 shows a perspective view of a grill of the indoor barbecue of FIG. 1.
Figure 6:
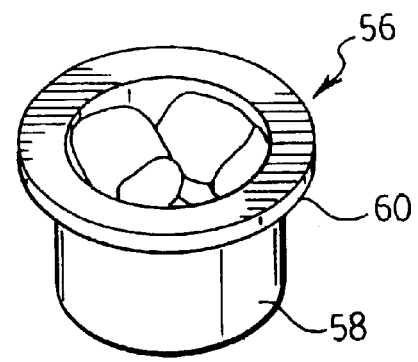
FIG. 6 shows a perspective view of a container of the indoor barbecue of FIG. 1 containing charcoal briquettes.

A generally rectangular removable cooking rack, or grill, 54 (shown in FIGS. 2, 3 and 5) rests on the horizontal surface of the lower step 38. The grill 54 includes a central cylindrical aperture for receiving a charcoal container 56. Referring now to FIGS. 2, 3 and 6, the charcoal container 56 includes a generally cylindrical hollow body 58 with an enclosed bottom and an upper peripheral lip 60 The charcoal container 56 is suitably sized and shaped to fit into the central cylindrical aperture of the grill 54 such that the lip 60 abuts the upper surface of the grill 54. When the charcoal container 56 is placed in the grill 54, the grill 54 supports the container 56 in the interior of the body 22. The container 56 is formed of a suitable material for receiving two hot charcoal briquettes therein.

It will be understood from the foregoing description and the figures that the drip tray 50 is located under the grill 54 and the heating elements 42 extend into the interior of the body 22, between the drip tray 50 and the grill 54.

Figure 7:
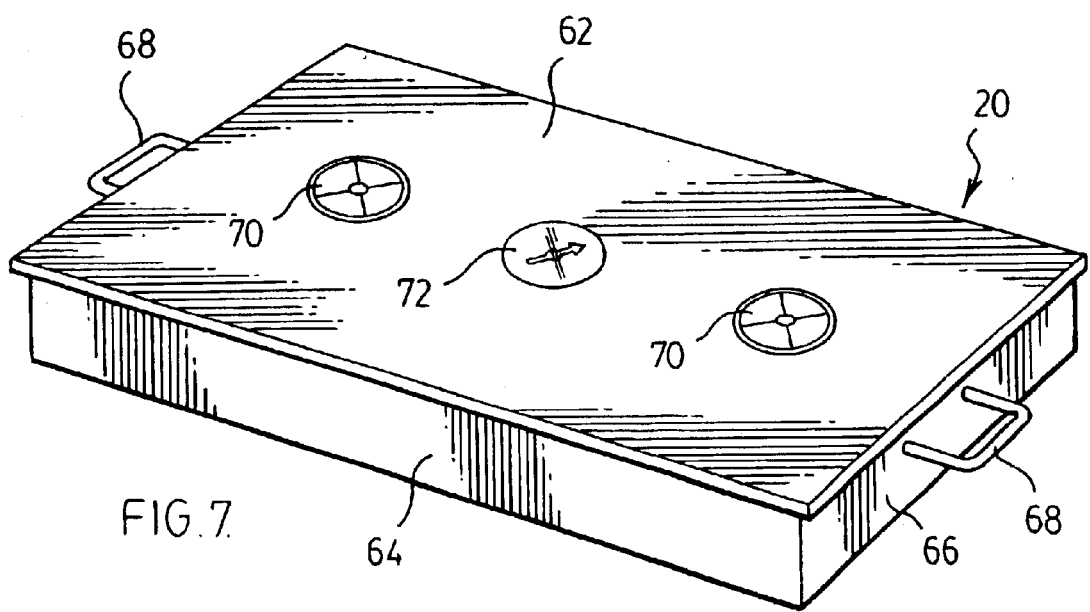
FIG. 7 snows a perspective view of a lid of the indoor barbecue of FIG. 1.

The lid 20 will now be described in more detail, with reference to FIGS. 1, 2 and 7. It will be appreciated that the lid 20 is suitably sized and shaped to fit inside the body 22 and rest on the horizontal surface of the upper step 36, thereby enclosing the body 22 to define a cooking chamber therein The lid 20 includes a generally rectangular top 62, a pair of side walls 64 and a pair of end walls 66, extending downwardly from the undersurface of the lid 20. The side walls 64 and end walls 66 are of sufficient size to support the lid 20 on the upper step 36 with portions of the side walls 64 and end walls 66 extending exterior of the body when the lid 20 is engaged with the body 22. A pair of handles 68 extend longitudinally outwardly from the portions of the end walls 66 that extend exterior of the body 22 when the lid 20 is engaged with the body 22.

Incorporated in the top 62 of the lid 20, are a pair of rotatable vents 70 which are rotatable between a closed position and an open position It will now be understood that the rotatable vents 70 each provide an upper aperture in the lid 20 when in the open position for venting the cooking chamber of the barbecue 18 A mechanical thermometer 72 is also incorporated into the top 62 of the lid 20 for measuring the temperature in the cooking chamber The use of the barbecue 18 will now be described with reference to the figures and to the preceding description Preferably, the barbecue 18 is located near a ventilation source such as a fan or an open window. When in use, absorbent material, such as crushed stone, is placed in the drip tray 50 to catch drippings from the food being prepared. The food is placed on the grill 54, but not over the charcoal container 56. One or two charcoal briquettes are pre-heated, for example on a stove-top element and placed in the charcoal container 56. Only a small number of charcoal briquettes are used in order to inhibit the production of a large volume of smoke and combustion by-products. A small amount of fat or butter is placed in the charcoal container 56 and the lid 20 is engaged with the body 22 to enclose the cooking chamber. The vents 70 of the lid 20 are closed (if they are not already closed) for a period of time to allow the smoke to subside. This can be monitored periodically by slightly opening one of the vents 70 until little or no smoke emanates from the vent 70. Next, the heating elements 42 are turned on to cook the food It will be understood that the absorbent material is replaced when saturated with fluid.

Alternative embodiments and variations to the above-described embodiment are possible. For example, the barbecue can be any suitable size or shape and is not limited to the above-described embodiment. The components of the barbecue can be made from any suitable metal or alloy Also, the lid can be any suitable cover and can have one or more vents and one or more handles for grasping and handling the lid. In the above-described embodiment, the grill rests on an interior surface of the lower step of the body, however other means for supporting the grill are possible. For example, the grill can be removably attached to the sides of the body using hooks or screws. Furthermore, the second step in the body is not necessary and the grill can rest on projections that extend inwardly from the interior surface of the side walls or end walls.

In an alternative embodiment of the invention, a door is incorporated into the stepped body, for easy removal of the tray, for example, to replace the absorbent material or replace the tray.

The barbecue is not limited to a specific food rack and can include the grill, as described, or can include any other suitable means, such as a rotisserie spit or skewer. Also, the food rack need not contain an opening for the charcoal container. Instead, the charcoal container can be supported or suspended anywhere in the interior of the body of the barbecue Similarly, the location of the electrical heating elements can vary. The container may contain other suitable combustible material.

Still other embodiments and variations are possible and all such embodiments and variations are believed to be within the scope and sphere of the present invention as defined by the claims.

What is claimed is:

1. A barbecue for indoor cooking of food, comprising:

a body defining a cavity;

a lid for engaging with the body to define a cooking chamber;

a barbecue grill supported by the body, within the cooking chamber;

a container for insertion into an aperture in said barbecue grill and being supported by the grill, said container for receiving combustible material;

a heat source provided within the cooking chamber for cooking the food when placed on the cooking rack; and a drip tray in the interior of the body, for receiving an absorbent material to absorb dripping from said food, wherein said container is removable from said aperture of said grill by lifting out of said aperture and is inserted by lowering into said aperture in said grill.

2. The barbecue according to claim 1, wherein said heat source comprises at least one electrical heating element.

3. The barbecue according to claim 1, wherein the body comprises a first step for supporting the lid, when the lid is engaged with the body.

4. The barbecue according to claim 3, wherein the body further comprises a second step for supporting said barbecue grill.

5. The barbecue according to claim 1, wherein the lid comprises at least one vent for venting the food chamber.

6. The barbecue according to claim 5, wherein the at least one vent is positionable between an open position and a closed position.

7. The barbecue according to claim 1, wherein the lid comprises a thermometer for gauging the temperature in the cooking chamber.

8. The barbecue according to claim 1, wherein the heat source comprises an electrical element disposed between the cooking rack and the drip tray.

9. A barbecue for indoor cooking of food, comprising:

a generally hollow body having side walls and a base;

a lid for engaging with the body to define a cooking chamber therein;

a grill supported by the body, within the cooking chamber;

a drip tray supported by the body, under the cooking rack where said body is in an upright position, for receiving an absorbent material to absorb drippings from said food;

an electric heat source supported by the body between the cooking rack and drip tray, for cooking the food; and a container for insertion into an aperture in said grill, said container supported by the grill within the cooking chamber, for receiving a combustible material, wherein said container is removable from said aperture of said grill by lifting out of said aperture and is inserted by lowering into said aperture in said grill.

10. The barbecue for indoor cooking of food according to claim 1, wherein said container is sized to receive up to two charcoal briquettes.

11. The barbecue for indoor cooking of food according to claim 9, wherein said container is sized to receive up to two charcoal briquettes.

* * * * *